June 3, 1947.  R. W. DILLON  2,421,549
VIBRATION DAMPING DEVICE
Filed Jan. 12, 1945  2 Sheets-Sheet 1
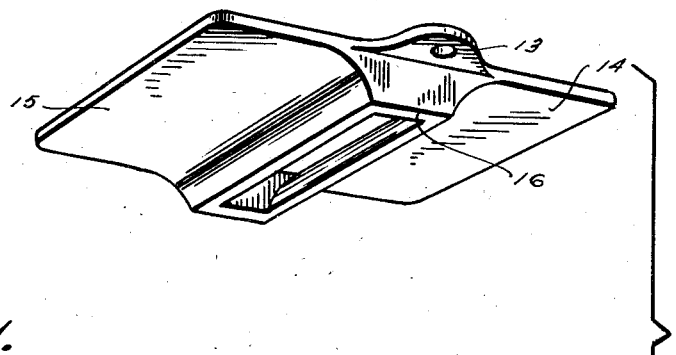
Fig.1.
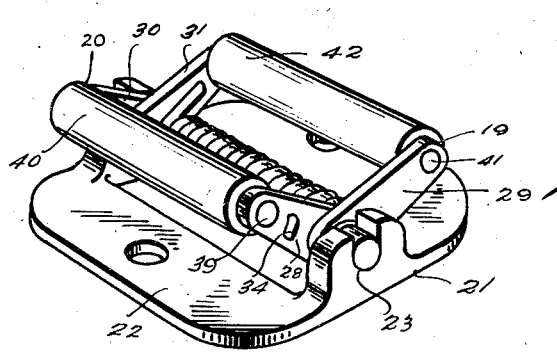
Fig.2.
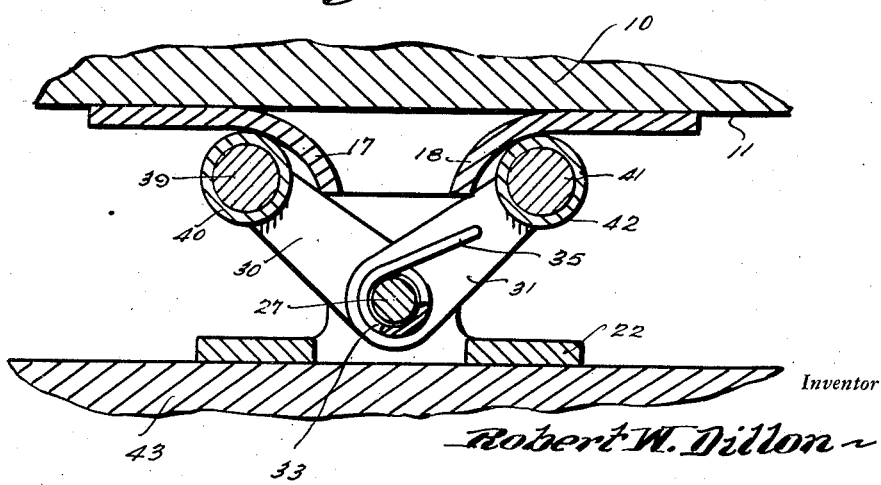
Inventor
Robert W. Dillon
By Clarence A. O'Brien
and Harvey B. Jacobson
Attorneys June 3, 1947. R. W. DILLON 2,421,549
VIBRATION DAMPING DEVICE
Filed Jan. 12, 1945 2 Sheets-Sheet 2
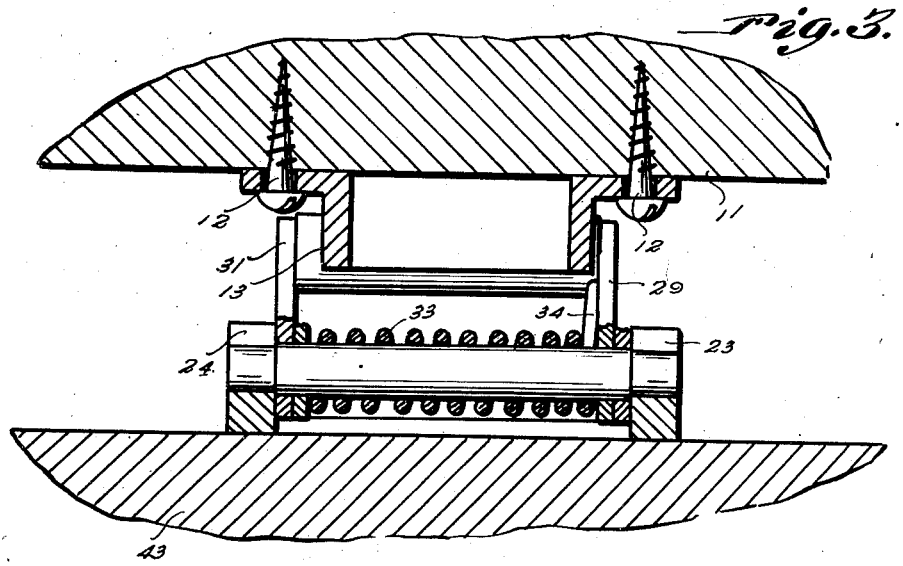
Fig. 3.
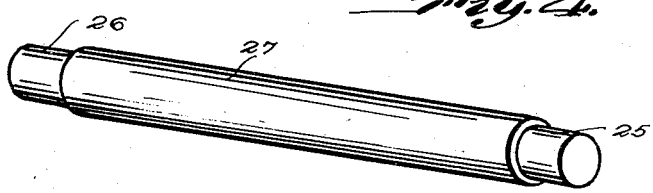
Fig. 4.
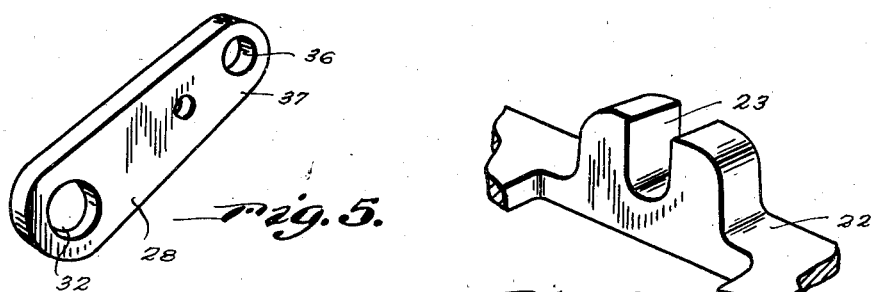
Fig. 5.
Fig. 6.
Inventor
Robert W. Dillon
By Clarence A. O'Brien
and Harvey B. Jacobson
Attorneys

UNITED STATES PATENT OFFICE 2,421,549

VIBRATION DAMPING DEVICE

Robert W. Dillon, Morgantown, W. Va.

Application January 12, 1945, Serial No. 572,512

5 Claims. (Cl. 248—20)

This invention relates to a shock absorber or damping device and has for its object to provide means whereby the vibrations of a piece of machinery may all be absorbed in the platform upon which the machine is seated and in my damping device.

The principal object of this invention is to provide a damping device by means of which vibrations of a machine can not be transmitted to other delicate instruments located nearby.

A further object of the invention is to provide spring control roller supporting arms having rotary motion in which vibration is absorbed.

A further object of the invention is to provide a pair of spring controlled roller-arm units, which units are controlled by a common helical spring and which units have revolving motion in opposite directions.

Other features and advantages will become more readily apparent from the following description and the accompanying illustrated drawing in which:

Fig. 1 is a prospective view of my damping device, members of which are shown separated, Figure 2 is a vertical sectional view of my device shown in operated position, Figure 3 is a transverse sectional view of Figure 2, Figure 4 is an enlarged detailed prospective view of a shaft such as I use in my device, Figure 5 is a similar view of arms used in my device, and Figure 6 is a broken away prospective view of a base member.

In the accompanying illustrations and the following specification like reference characters indicate like parts and in which 10 represents a base upon which a motor or other machine throwing off vibrations is mounted. Affixed to the under-surface of the base by screws 12, bolts or otherwise and preferably adjacent to the four corners of the base, are supports 13, provided with spread apart wings 14 and 15, which are formed arcuate at their junction with the body portion 16, of the member 13, as indicated at 17 and 18. Said body 16, is of a length and width to seat between a pair of arm-roller units 19 and 20, of a vibration solving device 21.

The vibration damping device 21 includes a base 22, having oppositely aligning U-bearings 23 and 24, in which the reduced ends 25 and 26, of a shaft 27, seat. Mounted rotatably upon the shaft at each end thereof and inwardly of said bearings are tapering arms 28 and 29, and 30 and 31. These arms are provided with bores 32, to receive the shaft 27. Mounted on the shaft is a helical spring 33, one end 34, of which is secured to the inner arm 28, and the other end 35, to the inner arm 31 of the opposing units 19, and 20. Mounted in the bores 36 in the reduced outer ends 37 and 38 of arms 28 and 30 is a shaft 39, upon which is mounted a roller 40. And similarly mounted upon the reduced outer ends of arms 29 and 31 is a shaft 41, supporting a roller 42.

In operating the vibrating machine, say a motor of any kind, is mounted upon four of my damping devices or one at each corner of the base thereof, the force of each pulsation of the machine being transferred through said base (the body 16, at each corner of the base seats between the rollers with wings 14 and 15 upon the rollers) to the rollers 40 and 42, causing the arms 28 and 30 and the arms 29 and 31 to spread apart in opposite directions against the tension of spring 33, which spring constitutes an angular or revolving movement of the arm-roller units around the shaft 27, at exactly the same acceleration, whereby every motion of one arm-rolling unit is exactly duplicated in reverse by the other arm-rolling unit, the shape, size, weight and action of each unit being the same with the exception that one moves reversely of the other. This means that the vibration which would otherwise set up in the shaft 27, by eccentric load of one arm-rolling unit revolving about the shaft is counteracted by the opposite action of the arm-roller unit of equal dimensions and distance from the center of the shaft. The helical spring 33, keeps the two roller-arm units together when no load is acting upon them. As the helical spring is tightened or loosened according to the load thereon, any vibration resulting from the action of the machine on the member 10, will all be taken up and dissipated in the spring, the consequence of which no vibrations will be transferred to the floor of the element 43 upon which the members 21 are mounted.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details and parts, such as come within the purview of the invention claimed, may be resorted to, in actual practice, if desired.

Having described my invention that which I claim as new and desire to secure by Letters Patent is:

1. A vibration damping device comprising spring control oppositely acting support members, rollers carried by said members, shafts upon which the rollers are mounted, a pair of rotatable arms for each of said shafts, a third shaft upon which the arms are rotatably mounted, a helical spring on said last shaft, one end of which is fixed to one of one pair of said arms and the other end to one of the other pair of said arms, and a base upon which the last shaft is mounted, a second base supporting body seated upon said rollers, wings extending from said body upon which said roller acts, said wings being arcuate with their connection in said body.

2. In a device as described a pair of arm-roller units arranged to operate in opposite directions, a shaft upon which the units are rotatable and a helical spring on the shaft connecting the units the tension of which is adapted to be tightened by the combined action of said units.

3. In a device as described a pair of arm-roller units arranged to operate in opposing directions and a shaft upon which the units are rotatably mounted, and means for resiliently biasing said units in opposite directions.

4. In a device as described a pair of arm-roller units arranged to operate in opposite directions and to receive a weight and a helical spring connecting and actuated by said units.

5. In a device as described a pair of arm-roller units arranged to operate in opposite directions, a helical spring connecting and actuated by said units, and a shaft upon which the units are rotatable and the spring is mounted.

ROBERT W. DILLON.

REFERENCES CITED

The following references are of record in the file of this patent:

UNITED STATES PATENTS

| Number | Name | Date |
| --- | --- | --- |
| 955,074 | Hyland | Apr. 12, 1910 |
| 1,033,434 | McIntosh | July 23, 1912 |
| 1,091,884 | Griffin et al. | Mar. 31, 1914 |
| 2,162,198 | Herrington | June 13, 1939 |
| 1,893,295 | Bailly | Jan. 3, 1933 |
| 2,035,446 | Barrett | Mar. 31, 1936 |